United States Patent [19]

Sydansk

[11] 4,433,729

[45] * Feb. 28, 1984

[54] PROCESS FOR SELECTIVELY REDUCING THE FLUID INJECTION RATE OR PRODUCTION RATE OF A WELL

[75] Inventor: Robert D. Sydansk, Littleton, Colo.

[73] Assignee: Marathon Oil Company, Findlay, Ohio

[*] Notice: The portion of the term of this patent subsequent to Dec. 8, 1998 has been disclaimed.

[21] Appl. No.: 299,918

[22] Filed: Sep. 8, 1981

Related U.S. Application Data

[63] Continuation-in-part of Ser. No. 164,618, Jun. 30, 1980, Pat. No. 4,304,301.

[51] Int. Cl.$^3$ .................... E21B 33/138; E21B 43/22
[52] U.S. Cl. ................................ 166/270; 166/292
[58] Field of Search ............... 166/270, 273, 292, 300; 405/263, 270

[56] References Cited

U.S. PATENT DOCUMENTS

| | | | |
|---|---|---|---|
| 2,001,350 | 5/1935 | Mills | 166/300 |
| 2,294,078 | 8/1942 | Dow et al. | 166/281 |
| 2,747,670 | 5/1956 | King et al. | 166/270 |
| 2,837,163 | 6/1958 | Ramos et al. | 166/270 X |
| 3,396,790 | 8/1968 | Eaton | 166/270 |
| 4,140,183 | 2/1979 | Holm | 166/270 |
| 4,304,301 | 12/1981 | Sydansk | 166/300 X |

*Primary Examiner*—George A. Suchfield
*Attorney, Agent, or Firm*—Jack L. Hummel

[57] ABSTRACT

A process for improving areal conformance of fluids injected into or produced from a subterranean formation via a multiwell system wherein significantly greater amounts of fluid than desired are injected into or produced from at least one well of the multiwell system than from other wells of the system. An aqueous caustic solution, an aqueous solution containing a polyvalent cation dissolved therein, and a hydrocarbon spacer separating the aqueous solutions are injected into the hydrocarbon formation. The aqueous solutions are caused to mix in the near well bore environment of said at least one well thereby forming an insoluble precipitate which reduces the permeability of the near well bore environment over substantially the entire well bore interval.

9 Claims, 2 Drawing Figures

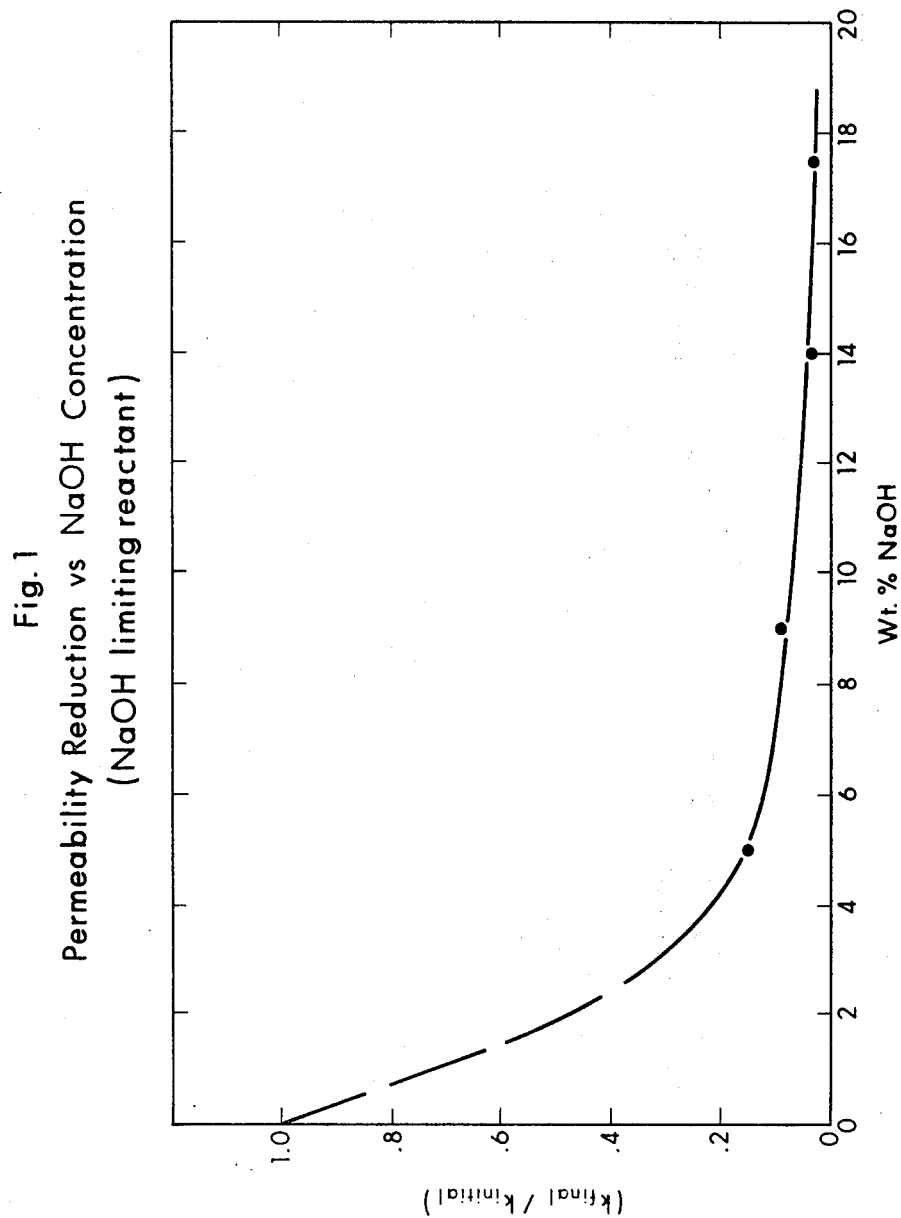

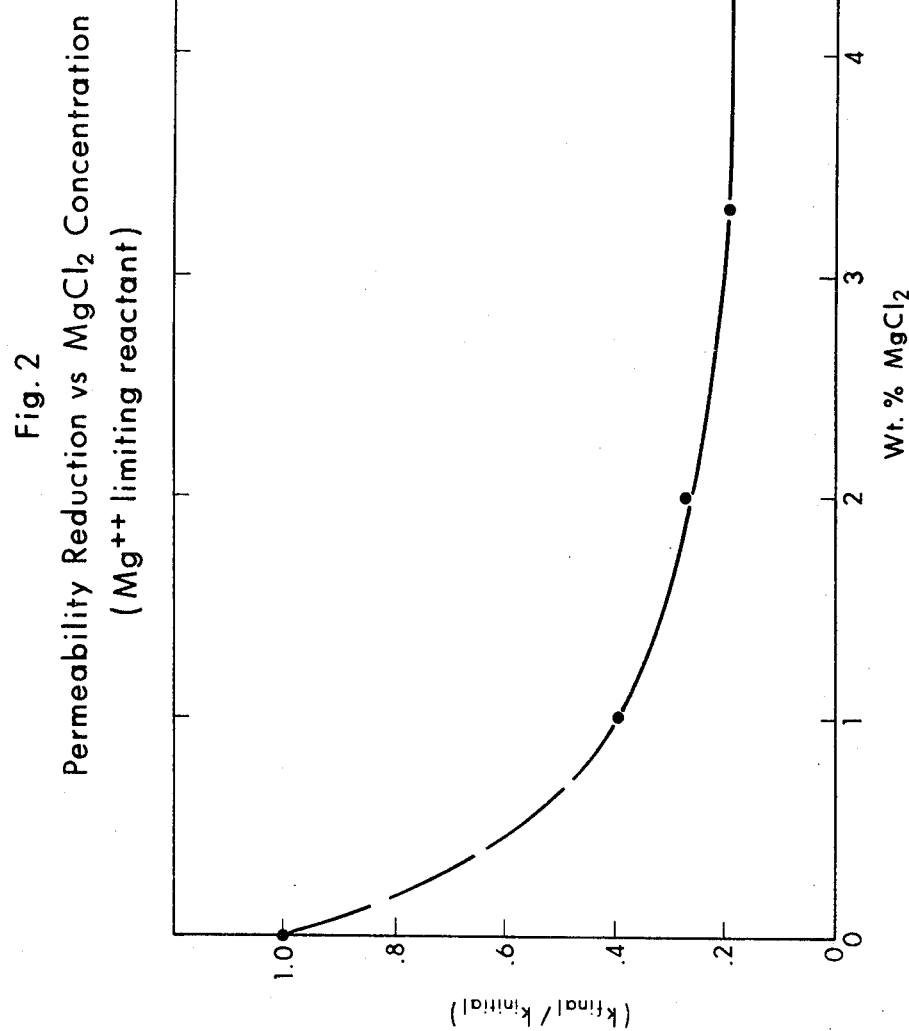

PROCESS FOR SELECTIVELY REDUCING THE FLUID INJECTION RATE OR PRODUCTION RATE OF A WELL

CROSS REFERENCE TO RELATED APPLICATIONS

This application is a continuation-in-part of our co-pending U.S. patent application Ser. No. 164,618 filed June 30, 1980, now Pat. No. 4,304,301.

DESCRIPTION

TECHNICAL FIELD

The present invention relates to a process for selectively reducing the fluid injection rate or production rate of a well, and more particularly, to a process for selectively reducing the fluid injection rate and/or production rate of one or more wells which are components of a multiwell system so as to improve areal conformance of fluids injected into or produced from the multiwell system, and thus increase hydrocarbon recovery from a subterranean formation.

BACKGROUND ART

Often a plurality of wells penetrating and in fluid communication with a subterranean hydrocarbon-bearing formation are utilized to inject fluids into and/or produce fluids, including hydrocarbons, from a portion of the formation or the entire formation. In this manner, areal conformance of the fluids injected into or produced from the formation can be improved thereby increasing hydrocarbon recovery. Where a portion of the subterranean formation is being produced, these wells can be arranged in conventional linear, 5-spot, 7-spot, etc., patterns or arrays, or where an entire formation is to be produced, the plurality of wells can be arranged in, for example, concentric ring patterns or arrays. Ideally, if fluid could be injected into all designated injection wells of such a multiwell system at rates which would result in uniform or balanced flood fronts and/or if fluids could be produced from all designated production wells of a multiwell system at rates which would maintain a uniform or balanced flood front, the areal conformance of fluids injected into and/or produced from a subterranean formation would be maximized. In actuality, one or more injection wells are characterized by a significantly greater fluid injection rate than other designated injection wells of a multiwell system, and/or one or more production wells are characterized by a significantly greater fluid production rate than other designated production wells of a multiwell system resulting in relatively poor areal conformance of fluids injected into and/or produced from the formation.

Prior art attempts to reduce the fluid injection rate or production rate of certain wells of a multiwell system in order to improve areal conformance of fluids injected into or produced from a subterranean formation have been relatively unsuccessful. One prior art approach involves the injection of well cement into an injection or production well to reduce the injection rate into or production rate from the well. However, as placement of the cement is extremely difficult to control, such an approach often results in either plugging only a portion of the entire well bore interval over which fluid can be injected into or produced from the formation, or in entirely terminating or shutting off flow of fluids into or from the wall bore. Other prior art attempts have employed aqueous fluids having reactive species dissolved therein which are sequentially injected into a well bore interposed by an aqueous spacer medium. These fluids eventually penetrate the aqueous spacer and mix at a substantial distance from the well bore. The species dissolved in the sequentially injected aqueous fluids react upon mixing to form a plugging precipitate. However, as radial flow of fluids injected into or produced from a well is predominantly influenced by the near well bore environment, failure of this prior art approach to reduce the permeability of the near well bore environment over the entire well bore interval has resulted in relatively poor areal conformance improvement of fluids injected into or hydrocarbons produced from a subterranean formation via a multiwell system.

Thus, a need exists for a process which selectively and predictably reduces the fluid injection rate or production rate of one or more wells of a multiwell system by effectively reducing the permeability in the near well bore environment so as to improve areal conformance of fluids injected into and/or produced from a subterranean formation via the multiwell system.

DISCLOSURE OF INVENTION

The present invention provides a process for improving areal conformance of fluids injected into or produced from a subterranean formation via a multiwell system wherein significantly greater amounts of fluid than required to result in or maintain a substantially uniform flood front are injected into or produced from at least one well of the multiwell system. An aqueous caustic solution and an aqueous solution containing a polyvalent cation dissolved therein are sequentially injected into the near well bore environment of the at least one well and caused to mix in the near well bore environment thereby forming a relatively insoluble precipitate which reduces the permeability of the near well bore environment over substantially the entire well bore interval.

BRIEF DESCRIPTION OF THE DRAWING

FIG. 1 is a graphical representation of the amount of permeability reduction obtained in the near well bore environment of a subterranean formation by the process of the present invention as a function of sodium hydroxide concentration, where sodium hydroxide is the limiting reactant; and FIG. 2 is a graphical representation of the amount of permeability reduction obtained in the near well bore environment of a subterranean formation by the process of the present invention as a function of magnesium chloride concentration, where magnesium chloride is the limiting reactant.

BEST MODE FOR CARRYING OUT THE INVENTION

The present invention relates to a process for selectively reducing the permeability in the near well bore environment and over the entire well bore interval of a well penetrating and in fluid communication with a subterranean formation so as to selectively reduce the fluid injection rate or production rate of the well. Often in a multiwell system wherein at least two wells penetrate and are in fluid communication with a subterranean hydrocarbon bearing formation, appreciably greater amounts of fluid than desired are produced from or injected into one or more wells thus resulting in unsymmetrical and uneven areal conformance of fluids produced from and/or injected into the subterranean formation via the multiwell system. Such poor areal conformance in turn results in inefficient hydrocarbon recovery from the multiwell system irrespective of whether primary, secondary, or tertiary recovery is being employed to produce fluids, including hydrocarbons, from the system. The process of the present invention functions to selectively and predictably reduce the fluid injection rate into or production rate from of at least one well of such a multiwell system so as to improve areal conformance of fluids injected into and/or produced from the hydrocarbon bearing subterranean formation via the multiwell system and increase hydrocarbon recovery therefrom. As utilized throughout this description, the term "multiwell system" in most instances refers to at least three wells penetrating and in fluid communication with a subterranean hydrocarbon-bearing formation wherein one or more wells are utilized to inject fluids into the formation and at least one other well is utilized to produce fluids from the formation. However, where fluids are produced from a subterranean formation utilizing primary recovery forces, a multiwell system can refer to at least two wells penetrating and in fluid communication with the formation, the wells being utilized to produce fluids from the formation.

As utilized throughout this description, the term "near well bore" denotes the area of a subterranean formation surrounding a well bore penetrating the same which exhibits relatively homogeneous horizontal characteristics and wherein mixing between sequentially injected aqueous fluids separated by an aqueous spacer will not readily occur to any substantial degree. Such mixing is dependent upon, inter alia, the volume of the aqueous spacer, the characteristics of the formation (i.e., the number of pore channels present in the formation, the permeability of the formation, and the geometry of the pores and pore throats of the formation), the characteristics of each injected fluid (e.g., the diffusion characteristics of each fluid, the viscosities of each fluid, the concentrations of reactive species in each fluid, and the relative mobilities of each injected fluid), and the injection rates of each injected fluid. Given such dependency, the degree of mixing which will occur at a desired distance from a well bore penetrating a formation can be determined by the skilled artisan. As a general guide, the near well bore environment usually extends a radial distance into the formation of up to about 10 feet from the well bore, and may extend up to about 30 feet or more. As also utilized throughout this description, the term "entire well bore interval" refers to that portion of the well bore which is in fluid communication with the subterranean formation into which fluids can be injected or from which fluids can be produced.

The process of the present invention comprises the sequential injection into selected well bore(s) of a multiwell system of two aqueous solutions, each solution containing separate dissolved species which will react upon mixing in the near well bore environment to produce a voluminous, relatively insoluble precipitate. More specifically, the process of the present invention involves the sequential injection of a first caustic, aqueous solution, a hydrocarbon spacer, and a second aqueous solution containing a dissolved polyvalent cation.

It has been unexpectedly discovered that the inclusion of a hydrocarbon spacer between a caustic, aqueous solution and a sequentially injected aqueous solution containing dissolved polyvalent cations causes mixing of the two aqueous solutions in the near well bore environment. Such mixing results in the formation of a precipitate in accordance with the following general reaction, wherein M represents the polyvalent cation:

$$M^{n+} + nOH^- \rightarrow M(OH)_n \qquad (1)$$

The resultant precipitate is a highly hydrated and dispersed, gel-like solid compound through which fluid flow is not completely prevented, but is greatly reduced.

While it is not completely understood exactly why the process of the present invention results in formation of precipitates in the near well bore environment, it is believed that the hydrocarbon spacer traps a portion of the previously injected solution within the residual and immobile water phase in each pore of that portion of the formation into which the solution containing a dissolved reactive species has been injected. Subsequent injection of an aqueous solution containing another dissolved reactive species results in the reaction of polyvalent cations with caustic within each pore in accordance with general reaction (1).

The caustic utilized in one of the aqueous solutions may be any hydroxide ion generating compound such as, sodium hydroxide, potassium hydroxide, lithium hydroxide or ammonium hydroxide, although sodium hydroxide is preferred for purposes of the present invention. The hydrocarbon employed as the hydrocarbon spacer may be any hydrocarbon which is a liquid at formation conditions and which does not react to any substantial degree with caustic. Thus, carboxylic acids (e.g. acetic acid) are not suitable for use as hydrocarbon spacers in the present invention. The hydrocarbon can be an alkane, alkene, aromatic or a mixture thereof. Examples of hydrocarbons which may be used in the present invention are gasoline, kerosene, jet fuel, diesel fuel, and heating oil. Any polyvalent cation which can be dissolved in an aqueous solution, for example, calcium or magnesium, may be employed in the other aqueous solution. The polyvalent cation can be incorporated into the solution as a salt, such as, for example, magnesium chloride.

The relative amount of caustic and polyvalent cation employed is dictated by the stoichiometry of general reaction (1). Either the polyvalent cation or caustic can be the limiting reactant, although for purposes of the present invention, it is preferred to utilize caustic as the limiting reactant and hence employ a stoichiometric excess of polyvalent cations. The concentration of the limiting reactant in an aqueous solution is determined by the amount of precipitate desired and can vary from an extremely small concentration, e.g., 0.1 wt.%, up to saturation level within the solution. The concentration of the non-limiting reactant in the aqueous solution is at least the stoichiometric amount required to completely react with the limiting reactant, with a stoichimetric excess preferably being employed.

In accordance with the present invention, the order in which the aqueous solutions are injected is not critical. The volume of the initially injected reactant injected into the near well bore environment is dictated by the depth of treatment desired. Once the depth is determined, the volume of the initially injected solution is approximately equal to or greater than the pore volume of the portion of the near well bore environment to be treated minus the volume of the residual oil in place. The volume of the initially injected reactant is critical since the injected volume dictates the depth of plugging and thus permeability reduction achieved thereby. The volume of hydrocarbon spacer injected is not critical, although preferably, the volume of hydrocarbon injected should be at least approximately equal to the volume of the initially injected solution.

By utilizing the process of the present invention, the permeability of the near well bore environment of a subterranean hydrocarbon-bearing formation can be predictably reduced over a relatively wide range utilizing either caustic or polyvalent cation as the limiting reactant as illustrated in FIGS. 1 and 2. The process of the present invention is preferentially employed to selectively reduce the permeability of the near well bore environment of a subterranean hydrocarbon bearing formation over substantially the entire well bore interval of a well penetrating and in fluid communication with the subterranean formation so as to selectively and predictably reduce the fluid injection rate and/or production rate of the well and improve areal conformance of fluid injection into or produced from a multiwell system. The following examples are illustrative of the application of the process of the present invention and are not to be construed as limiting the scope thereof.

EXAMPLE 1

A 7.6 cm×2.5 cm diameter linear, unfired, homogeneous Berea sandstone plug having an initial permeability of 460 md is sequentially injected with a 3 wt.% NaCl solution, a caustic solution, a water spacer, a polyvalent cation solution and finally a 3 wt.% NaCl solution. The injected fluids and the plug are maintained at 85° C. by a heat exchanger. The fluid permeability of the plug after this sequential injection treatment is measured and compared with the initial permeability. The results are set forth in Table 1.

TABLE 1

| Fluid | Pore Volumes Injected | Permeability (k) (md) | k/final k/initial |
|---|---|---|---|
| 3.0 wt. % NaCl | | 460 | |
| 4.0 wt. % NaOH in 3.0 wt. % NaCl | 0.33 | | |
| 3.0 wt. % NaCl | 0.25 | | |
| 2.0 wt. % CaCl$_2$ in 3.0 wt. % NaCl | 0.25 | | |
| 3.0 wt. % NaCl | | 440 | 0.96 |
| Second Sequence | | | |
| 4.0 wt. % NaOH in 3.0 wt. % NaCl | 0.33 | | |
| 3.0 wt. % NaCl | 0.17 | | |
| 2.0 wt. % CaCl$_2$ in 3.0 wt. % NaCl | 0.25 | | |
| 3.0 wt. % NaCl | | 480 | 1.09 |

The permeability reduction achieved by this treatment is not large enough ($k_{final}/k_{initial}=0.96$) to significantly reduce fluid injection rates or production rates and thus improve areal conformance. As indicated in Table 1, the same plug was injected with a second sequence of caustic solution, aqueous spacer and polyvalent cation solution in an attempt to further reduce the permeability of the plug. This example illustrates the failure of prior art processes utilizing an aqueous spacer slug between two aqueous solutions containing reactive species to reduce the permeability of the near well bore environment.

EXAMPLE 2

A 7.6 cm×2.5 cm diameter linear, unfired, homogeneous Berea sandstone plug having a n-decane residual oil saturation is sequentially injected with a synthetic water flood injection brine, a 3 wt.% NaCl solution, a 30 wt.% NaOH solution, an n-decane spacer, a 10 wt.% MgCl$_2$ solution, and a synthetic water flood injection brine. The injected fluids and the plug are maintained at 85° C. by a heat exchanger. The synthetic water flood injection brine has a constituency concentration of 18,600 ppm NaCl, 3,820 ppm MgCl$_2$, 3,070 ppm Na$_2$SO$_4$ and 875 ppm CaCl$_2$. The fluid permeability of the plug after treatment is measured and compared with the initial permeability ($k_{final}/k_{initial}$). These results are set forth in Table 2.

TABLE 2

| Fluid | Volume Injected | Mobility (md/cp) | Permeability (k) (md) | $k_{final}/k_{initial}$ |
|---|---|---|---|---|
| Syn. Injection Brine | 0–2.0 | 107 | 38.5 | 1.00 |
| 3.0% NaCl | 0–2.0 | 107 | 38.5 | 1.00 |
| 30.0% NaOH | 0–2.0 | 18.8 | | |
| n-decane | 0–2.0 | 19.6 | | |
| 10% MgCl$_2$ | 0–2.0 | 7.63 | | |
| Syn. Injection Brine | 0–8.0 | 13.8 | 4.94 | 0.13 |

This test is repeated in a homogeneous sandstone plug from an Oligocene aged reservoir utilizing a 25 wt.% MgCl$_2$ solution. The results of this second test are reported in Table 3.

TABLE 3

| Fluid | Pore Volume Injected | Mobility (md/cp) | Permeability (k) (md) | $k_{final}/k_{initial}$ |
|---|---|---|---|---|
| Syn. Injection Water | 0–10.0 | 13.0 | 4.62 | 1.00 |
| 3.0% NaCl | 0–5.5 | 13.4 | 4.81 | 1.04 |
| 30.0% NaOH | 0–3.0 | 1.75 | | |
| n-decane | 0–2.0 | 4.99 | | |
| 25% MgCl$_2$ | 0–1.1 | .161 | | |
| Syn. Injection Brine | 0–2.0 | .141 | .051 | .011 |

EXAMPLE 3

A 7.6 cm×2.5 cm diameter linear, unfired, homogeneous Berea standstone plug is sequentially injected with a synthetic water flood injection brine, a 1 wt.% KCl solution, 34.4 wt.% KOH solution, a n-decane spacer, a 10 wt.% MgCl$_2$ solution, and a snythetic water flood injection brine. The injected fluid and plugs are maintained at 85° C. by a heat exchanger. The concentration of the constituents in the synthetic injection brine is indentical to the constituency concentration of the brine utilized in Example 2. Fluid permeability after this treatment is measured and compared with the initial permeability. Results of this test are set forth in Table 4.

TABLE 4

| Fluid | Pore Volume Injected | Mobility (md/cp) | Permeability (k) (md) | $k_{final}/k_{initial}$ |
|---|---|---|---|---|
| Syn. Injection Water | 0–2.0 | 117 | 41.8 | 1.00 |
| 1.0% KCl | 0–2.0 | 122 | | |
| 34.4% KOH | 0–2.0 | 40.6 | | |
| n-decane | 0–1.5 | 19.4 | | |
| 10% MgCl$_2$ | 0–3.0 | 3.58 | | |
| Injection Brine | 0–1.0 | 6.49 | 2.32 | .055 |
| | 1.0–5.0 | 6.29 | 2.25 | .054 |

As indicated in Examples 2 and 3, use of a hydrocarbon spacer in lieu of a water spacer between a caustic aqueous solution and an aqueous solution containing a polyvalent cation unexpectedly results in the formation of insoluble precipitates in the near well bore environment. These precipitates substantially reduce the rate of fluids injected into or produced from the near well bore environment.

EXAMPLE 4

A 7.6 cm×2.5 cm diameter linear, unfired, homogeneous Berea standstone plug having an initial permeability of 710 md and 38.5 md at residual saturation with n-decane is sequentially injected with a 3 wt.% NaCl solution, a 30 wt.% NaOH solution, an n-decane spacer, a 10 wt.% MgCl$_2$ solution, and a 3 wt.% NaCl solution. The injected fluids and the plug are maintained at 85° C. by heat exchanger. Utilizing 2 pore volumes of the n-decane spacer, the fluid permeability measured after the sequential treatment is 4.94 md resulting in a permeability reduction of $k_{final}/k_{initial}=0.13$ in the plug. Such significant permeability reduction in the near well bore environment will result in reduced injection or production rates of injected or produced fluids, respectively.

This sequential fluid injection is repeated on a second 7.6 cm×2.5 cm diameter Berea plug having an initial permeability of 710 md and 46.6 md at residual saturation with n-decane utilizing 20 pore volumes of n-decane spacer. The injected fluids and the plug are maintained at 85° C. by a heat exchanger. The fluid permeability of the plug measured after completion of the repeated sequential injection is 4.47 md resulting in a permeability reduction of $k_{final}/k_{initial}=0.10$. These results indicate the permeability reduction achieved by the process of the present invention is dependent of the volume of hydrocarbon spacer utilized. The amount of hydrocarbon spacer employed will be dictated in part by the amount of the first initially injected aqueous solution, the volume of the entire well bore interval, and the cost of the hydrocarbon.

EXAMPLE 5

This example illustrates the effects of repeated application of the process of the present invention on permeability reduction in the near well bore environment of a subterranean formation. A homogeneous sandstone plug from an Oligocene aged reservoir having an initial permeability of 37 md is sequentially injected with a synthetic water flood injection brine, a 10 wt.% KCl solution, a 14 wt.% NaOH solution, a #2 diesel fuel spacer, 11 wt.% MgCl$_2$ in a synthetic water flood injection brine solution and a synthetic water flood injection brine. The injected fluids and the plug are maintained at 38° C. by a heat exchanger. The concentration of constituents in the synthetic injection brine is identical to the constituency concentration of the brine utilized in Example 2. The sequential injection is repeated and the fluid permeability is measured after each injection. The permeability reduction is calculated for each sequential injection treatment and the results of this repeated application are reported in Table 5.

TABLE 5

| Condition | k/final k/initial | k/final k'/initial |
|---|---|---|
| After first treatment application | 0.19 | — |
| After second treatment application 790016-B | 0.059 | 0.20 |

Note: $k'_1$ is final permeability of the sandstone plug to the caustic flood of the second application. The caustic flood of second application increased to some extent the permeability of the plug due in part to settling of the precipitate, and thus, reduced the relative effect of the first treatment.

The results of this test indicate that the permeability reduction achieved by repeated application of the process of the present invention to the near well bore environment is cumulative.

The process of the present invention can be applied to formations having widely varying temperatures and mineralogy, and is insensitive to the volume of hydrocarbon spacer injected. Also, multiple applications of the sequential injection of the present invention will further reduce the permeability of the near well bore environment and thus fluid mobility therethrough. And although the present invention has been described as a process involving the sequential injection of two aqueous solutions containing dissolved reactants interposed with a hydrocarbon spacer, the hydrocarbon spacer can be initially introduced into the near well bore environment, followed by caustic injection where the formation connate water contains polyvalent ions in a sufficient concentration to form large amounts of precipitate.

It is important to note that the permeability reduction effects of the process of the present invention can be reversed by the application of a mineral acid, such as, hydrochloric acid. Ammonium chloride which is inexpensive and readily available can also be employed in solution to dissolve the precipitate.

As thus described, the process of the present invention can be applied to selected wells of a multiwell system to reduce the injection or production rates of each well selected over the entire well bore interval thereof and by so doing, improve the areal conformance of fluids injected into or produced from the multiwell system. The process of the present invention can be most advantageously applied to a given well by averaging the permeabilities over the entire well bore interval and treating the well based upon this average permeability.

While the foregoing preferred embodiment of the invention has been described and shown, it is understood that all alternatives and modifications, such as those suggested, and others may be made thereto, and fall within the scope of the invention.

I claim:

1. A process for improving areal conformance of fluids injected into or produced from a subterranean formation via a multiwell system, the multiwell system having at least one well wherein appreciably greater amounts of fluid than required to result in or maintain a uniform flood front are injected into or produced from the at least one well than other wells of the multiwell system, the at least one well having a well bore penetrating and in fluid communication with the formation which has a near well bore environment, the process comprising:

injecting into said near well bore environment via said well bore a caustic aqueous solution;

injecting into said near bore environment via said well bore a polyvalent cation containing aqueous solution having a polyvalent cation dissolved therein, said polyvalent cation reacting with said caustic when said caustic aqueous solution mixes with said polyvalent cation containing aqueous solution to form an insoluble precipitate over substantially the entire well bore interval in said near well bore environment of the formation; and injecting into said near well bore environment via said well bore a hydrocarbon spacer between said caustic aqueous solution and said polyvalent cation containing aqueous solution, said hydrocarbon spacer causing delayed mixing of said solutions until said solutions are in said near well bore environment and said mixing resulting in formation of said insoluble precipitate which reduces the permeability of said near well bore environment over substantially the entire well bore interval.

2. The process of claim 1 wherein said caustic aqueous solution is an aqueous solution of sodium hydroxide.

3. The process of claim 2 wherein said polyvalent cation is magnesium and said insoluble precipitate is magnesium hydroxide.

4. The process of claim 3 wherein sodium hydroxide is the limiting reactant and a stoichiometric excess of magnesium is contained in said second aqueous solution.

5. The process of claim 1 wherein said caustic aqueous solution is injected into said near well bore environment prior to said polyvalent cation containing aqueous solution.

6. The process of claim 1 wherein the volume of said caustic aqueous solution which is injected into said near well bore environment is about equal to the pore volume of said near well bore environment minus the volume of the residual oil contained in said near well bore environment.

7. The process of claim 1 wherein said hydrocarbon spacer is selected from the group consisting of liquid alkanes, alkenes, aromatics or mixtures thereof.

8. The process of claim 7 wherein said hydrocarbon spacer is diesel fuel.

9. The process of claim 1 wherein said subterranean formation is a subterranean hydrocarbon-bearing formation.

* * * * *